United States Patent [19]
McGee et al.

[11] Patent Number: 4,942,539
[45] Date of Patent: Jul. 17, 1990

[54] METHOD AND SYSTEM FOR AUTOMATICALLY DETERMINING THE POSITION AND ORIENTATION OF AN OBJECT IN 3-D SPACE

[75] Inventors: H. Dean McGee, Rochester Hills; Kenneth W. Krause, Rochester; Bruce E. Coldren, Troy, all of Mich.

[73] Assignee: GMF Robotics Corporation, Auburn Hills, Mich.

[21] Appl. No.: 287,885

[22] Filed: Dec. 21, 1988

[51] Int. Cl.$^5$ .............................................. G01B 11/00
[52] U.S. Cl. .................................. 364/513; 358/101; 901/47
[58] Field of Search ...................... 364/513, 516, 559; 901/47; 358/101, 107; 356/2, 375

[56] References Cited

U.S. PATENT DOCUMENTS

| | | | |
|---|---|---|---|
| 4,488,173 | 12/1984 | DiMatteo et al. | 364/559 |
| 4,581,762 | 4/1986 | Lapidus et al. | 364/559 |
| 4,630,225 | 12/1986 | Hisano | 364/559 |
| 4,680,802 | 7/1987 | Nishida et al. | 364/559 |
| 4,791,482 | 12/1988 | Barry et al. | 364/107 |

*Primary Examiner*—Allen MacDonald
*Attorney, Agent, or Firm*—Brooks & Kushman

[57] ABSTRACT

A method and system for automatically determining the position and orientation of an object by utilizing as few as a single digital image generated by as few as a single camera without the use of a structured light. The digital image contains at least three non-colinear geometric features of the object. The three features may be either coplanar or non-coplanar. The features or targets are viewed such that perspective information is present in the digital image. In a single camera system the geometric features are points, and in a multi-camera system, the features are typically combinations of points and lines. The location of the features are determined and processed within a programmed computer together with reference data and camera calibration data to provide at least three non-parallel 3-D lines. The 3-D lines are utilized by an iterative algorithm to obtain data relating to the position and orientation of the object in 3-D space. The resultant data is subsequently utilized to calculate an offset of the object from the camera. The offset is then transformed into the coordinate system or frame of a peripheral device such as a robot, programmable controller, numerically controlled machine, etc. Finally, the programmed computer transfers the transformed offset to the peripheral device which utilizes the transformed offset to modify its preprogrammed path.

41 Claims, 4 Drawing Sheets

METHOD AND SYSTEM FOR AUTOMATICALLY DETERMINING THE POSITION AND ORIENTATION OF AN OBJECT IN 3-D SPACE

TECHNICAL FIELD

This invention relates in general to 3-D machine vision methods and systems for determining the position and attitude or orientation of an object from as few as one digital image generated by as few as a single 2-D sensor such as a camera.

BACKGROUND ART

3-D machine vision systems utilize a number of different schemes such as range finding, structured light and binocular vision to see in three dimensions. Range finding and structured light schemes are typically the easiest to implement. Both techniques rely for depth cues on the way light or other radiation such as sound waves reflect from the surface of an object. Range finding systems typically time the reflection of the laser beam to the object and back again to measure its distance—similar to radar.

Structured light systems project light in a controlled manner on the object. The system then determines the distance to the object by triangulation and deduces the object's shape from the pattern formed by the intersection of the object's surface with the beam of light.

The use of structured, point source, coherent or other types of specialized lighting is fundamental to much of the prior art. For example, such specialized lighting is disclosed in the U.S. Pat. Nos. to Kremers et al 4,412,121 and Haefner et al 4,675,502.

Binocular vision systems utilize two cameras and employ the same general approach as that used in human vision (i.e. binocular parallax). The slight disparity between the two views of the same scene is used as a depth cue, i.e. the greater the parallax the closer the object.

One problem associated with the development of a practical machine vision system based on binocular parallax is the "correspondence" problem. That is, objects in each view must match with one another before the disparity between the two views can be determined. Matching can be a problem because, as a result of the parallax, an object may appear slightly differently in the right and left views and may be partially or totally obscured in one view.

3-D vision systems which rely on the range finding or structured light schemes are also inherently limited because they require interaction with the object under observation. These systems may be adequate for many applications. However, a vision system should be passive to avoid putting constraints on the observed objects or their environment.

The U.S. Pat. Nos. to Egli et al., 4,672,562 and Hay et al, 4,238,828 require the use of non-coplanar targets on an object which constrain the type of observed objects which can be viewed by the systems disclosed.

The paper entitled "New Methods For Matching 3-D Objects With Single Perspective Views" authored by Horaud and which appeared in the IEEE Transactions On Pattern Analysis And Machine Intelligence, Vol. PAMI-9, May 1987, pages 401–412, discloses a computer vision system which derives properties of the 3-D physical world from viewing 2-D images. A model-based interpretation of a single perspective image is performed. Image linear features and linear feature sets are back-projected onto a 2-D plane of 3-D space and geometric models are then used for selecting possible solutions. In general, the paper describes a computationally intensive method of interpreting the back-projections of the three dimensional scenes onto the 2-D plane.

Other related vision methods and systems are disclosed in the U.S. Pat. Nos. to Kano, 4,099,880; Dimatteo et al., 4,402,608 and Ruott, Jr. 3,986,007.

DISCLOSURE OF INVENTION

An object of the present invention is to provide a method and system to automatically determine the position and orientation of a 2-D body and space in a quick and accurate fashion yet inexpensively with as few as generated by a single 2-D sensor angle digital image.

Another object of the present invention is to provide a method and system for automatically determining the position and orientation of a 3-D body in a rapid fashion wherein small variations in the body in ambient-like conditions are tolerated without significantly degrading performance by utilizing the perspective information present in as few as a single digital image.

Still another object of the present invention is to provide a method and system for automatically determining the position and orientation of a 3-D object wherein as few as a single camera is utilized and wherein the camera need not be specially constructed.

It is still another object of the present invention to provide a method and system for automatically determining the position and orientation of an object in a factory environment from a single digital image generated from as few as a single camera without special lighting such as structured lighting.

In carrying out the above objects and other objects of the present invention, a method is provided for automatically determining the position and orientation of an object in 3-D space from as few as one digital image generated by as few as one 2-D sensor. The method includes the steps of generating calibration data relating the position and orientation of the 2-D sensor to the 3-D space and generating reference data relating to at least three non-colinear geometric features of an ideal object. The method also includes steps of generating the digital image containing at least three non-colinear geometric features of the object, locating each of the features in the digital image and computing at least three non-parallel 3-D lines as a function of the feature locations and the sensor calibration data. Each of the 3-D lines passes through its respective feature of the object. The method finally includes the step of utilizing the reference data and the 3-D lines to determine the position and orientation of the object.

Preferably, the method is utilized to provide path compensation data to a programmable peripheral drive such as a robot controller to enable a robot controller to move along a new path different from the path originally programmed in the controller so that the robot can work on the object. The path compensation data relates to the difference between the actual and expected positions of the object. When utilized in this fashion, the method further includes the additional steps of calculating an offset of the object from the 2-D sensor as a function of the position and orientation of the object and transforming the offset of the object to the coordinate frame of the peripheral device.

A system for automatically determining the position and orientation of an object in 3-D space from as few as one digital image generated by as few as one 2-D sensor and constructed in accordance with the present invention includes first means for storing reference data relating to at least three non-colinear geometric features of an ideal object. The system further includes 2-D sensor means for generating the digital image containing the least three non-colinear geometric features of the object and second means for storing sensor calibration data relating the position and orientation of the 2-D sensor means to the 3-D space. The system also includes means for locating each of the features in the digital image and means for computing at least three non-parallel 3-D lines as a function of the feature location and the sensor calibration data. Each of the 3-D lines pass through its respective feature of the object. Finally, the system includes means for utilizing the reference data and the 3-D lines to determine the position and orientation of the object.

Preferably, the method and system operate without the use of structured or specialized lighting.

Also, preferably, the system is used to automatically provide path compensation data to a programmable peripheral device such as a programmed robot controller to enable a robot controller to thereby move along a new path different from the path originally programmed in the controller to work on the object. The path compensation data is related to the difference between the actual and expected positions of the object. When utilized in this fashion, the system further includes means for calculating an offset of the object from the 2-D sensor means as a function of the position and orientation of the object and means for transforming the offset of the object to the coordinate frame of the peripheral device.

The advantages of the above described method and system are numerous. For example, as few as a single digital image generated by as few as a single camera is required for complete six degree of freedom offsets. Many prior art systems require the use of multiple cameras. While the present invention does not preclude the use of multiple cameras (i.e. used to enhance precision for large objects of interest or used when one or more targets or features may be occluded when viewed by a single camera) many applications of the method are suitable for use by a vision system including a single camera.

Also, as few as three non-colinear targets or features are required. However, more targets may be utilized not only for redundancy as in the case with prior art vision methods and systems such as disclosed in the U.S. Pat. Nos. to Day et al. 4,639,878 or Pryor 4,654,949, but also for minimizing the error by finding the single six degree of freedom offset which best fits the multiple target images.

Typically, the targets are existing features on the body of interest. Consequently, target requirements are minimized. The only requirements on the targets or features is that the targets be viewed such that perspective information is present and the targets are not all colinear. The targets or features may be either coplanar or non-coplanar. The targets or features for a method and system utilizing the present invention may be represented as points in the image such as centers of gravity for small closed features, intersection of lines etc. For multiple camera systems, the features may be combinations of points and lines which are not necessarily intersecting.

Other advantages of the present invention will be readily understood as the same becomes better understood by reference to the following detailed description when considered in connection with the accompanying drawings.

BEST MODE FOR CARRYING OUT THE INVENTION

Figure 1:
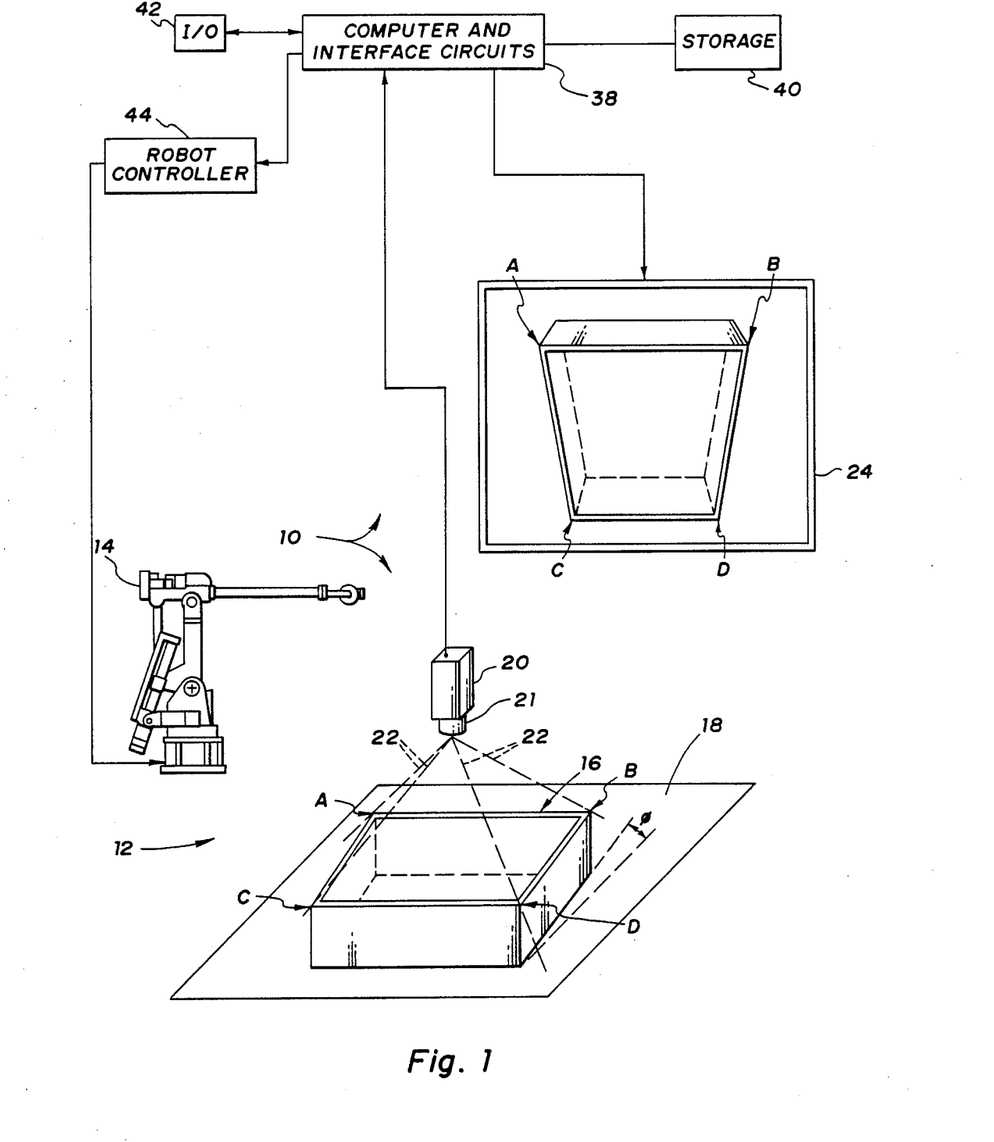
FIG. 1 is a perspective view illustrating the operation of the method and system of the present invention with respect to a rectangular object at a work station or cell having a robot located therein.

Referring now to FIG. 1, there is illustrated a machine vision system generally referred to at 10, which is not only robust (i.e. relatively unaffected by changes in lighting, body position and reflectivity of the viewed object) but also requires as few as a single camera to provide complete six degree of freedom offsets. Typically, as few as three targets or features are required to be viewed. The only requirement is that the targets be non-colinear. The targets or features may be either coplanar or non-coplanar.

Typically, the targets are existing features of the object of interest such as lines and/or points The points may be centers of gravity for small closed features, intersections of lines etc.

The vision system 10 is intended but not limited to be employed at a work station or cell, generally indicated at 12. At the work station 12, the system 10 is capable of communicating with peripheral devices such as a robot 14 or other peripheral devices such as programmable controllers, numerically controlled machines, other visions systems, plant data management systems and the like.

The system 10 may be utilized in other applications including applications wherein the system 10 may control several work cells by sharing its time between the work cells.

As illustrated in FIG. 1, a rigid body or object to be viewed is generally indicated at 16. The object 16 is supported on a surface 18 at the station 12. In general, the object 16 is loosely supported on the surface 18 so the exact position and attitude or orientation of the object 16 is not known. For example, the object 16 rests on the surface 18 at an angle $\theta$. However, the system 10 is capable of seeing the object's entire window of positional uncertainty.

In general, the system 10 utilizes at least three non-colinear geometric features of the object 16 such as points A, B, C and D which are the edge points of the rectangular object 16 as visual targets or target points. The visual targets or geometric features of the object 16 may alternately comprise a predetermined edge or corner of the object 16 or centers of gravity of small closed features or a combination of the above features as long as they are contained within the field of view of the vision system 10.

The system 10 includes a conventional 2-D sensor such as a camera 20. The camera 20 is preferably a conventional CCD which provides standard television output signals. Also, preferably, the camera 20 includes an optical lens system 21 having a relatively wide angle and short focal length.

The camera 20 is preferably positioned above the object 16 within the work station 12. The view lines of the camera are illustrated at 22 and intersect at the optical center of the lens system 21. The points A, B, C and D are disposed within the field of view of the camera 20 so that the camera 20 generates a digital image plane of data which includes data related to the points A, B, C and D as illustrated at reference numeral 24. The plane of data 24 is a perspective image of the object 16.

In general, the camera 20 may be placed anywhere in the work cell 12 as long as the points A, B, C and D are within the cameras field of view. The camera 20 may be above, below or alongside the object 16. One restriction, however, is that the points A, B, C and D are non-colinear. However, the points A, B, C and D may be coplanar. Optimum performance is achieved when the view lines 22 to the points A, B, C and D are at a significant angle to each other.

A single camera such as the camera 20 may be utilized in the system 10 in the generation of six degree of freedom offsets as will be described in greater detail hereinbelow. However, multiple cameras, including the camera 20, may be used to enhance precision for large objects of interest or when one or more target points or features may be occluded when viewed by a single camera such as the camera 20. In such multiple camera systems, the geometric features may be combinations of points and lines wherein the lines need not intersect.

The system 10 does not require any special lighting such as structured lighting. Relatively large variations in the ambient lighting have a minimal effect on the accuracy of the system 10. However, artificial lighting is preferable if the camera 20 is located in extreme darkness such as might be encountered in a poorly illuminated assembly area. Artificial lighting may also be desirable if the work station 12 regularly experiences large changes in ambient light as might happen with direct sunlight. However, in both of the above noted cases, only relatively low-cost light fixtures are necessary for a suitable lighting environment.

Figure 2:
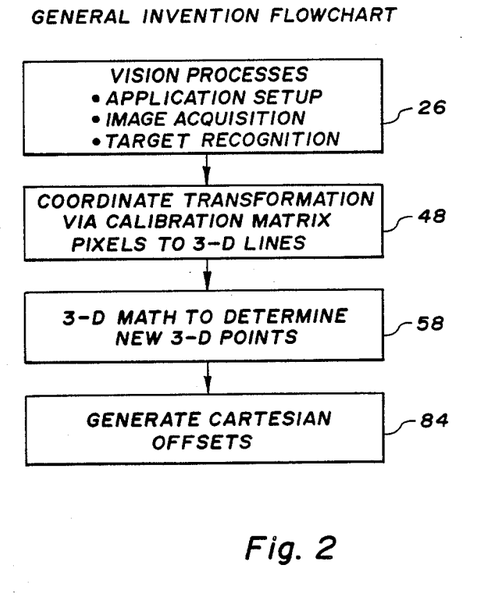
FIG. 2 is a generalized block diagram of the vision process.
Figure 3:
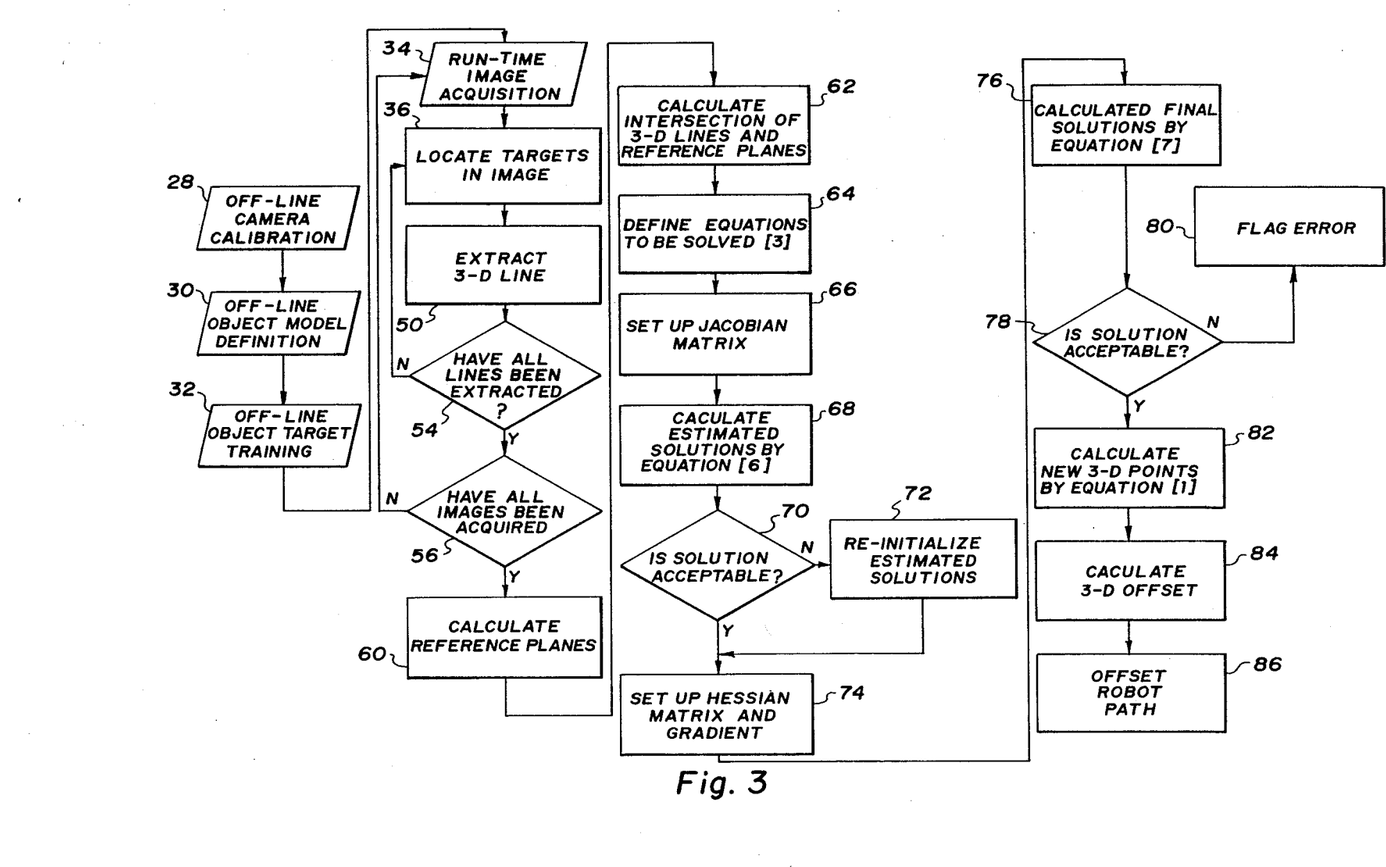
FIG. 3 is a more detailed block diagram of the block diagram of FIG. 2.

Referring now to FIG. 2, there is illustrated at block 26 the various vision processes accomplished in the method and system of the present invention. FIG. 3 illustrates in greater detail the various vision processes contained within block 26 at blocks 28 through 36.

At block 28, the camera 20 is initially calibrated off-line at the station 12. The camera is calibrated to determine internal camera geometric and optical characteristics (intrinsic parameters) and the 3-D position and orientation of the camera frame relative to the coordinate system at the station 12. Also, the camera calibration data includes effective focal length, radial lens distortion and image scanning parameters. Preferably, the camera 20 is calibrated in accordance with the teachings disclosed in the paper entitled "An Efficient and Accurate Camera Calibration Technique For a 3-D Machine Vision" authored by Roger Y. Tsai and which appears at pages 364–374 of IEEE Paper, CH 2290-5/86/0000/0364.

Computer and interface circuits 38 of the system 10 programmed in accordance with the teachings of the above paper translate the video signals from the camera 20 into the required information for calibration.

At block 30, the model definition of the object 16 is also generated off-line in a conventional fashion. Block 32 relates to conventional object target training of the system 10 which is also done off-line after the model of the object is generated at block 30 for use within the vision system 10. In the block 30, reference data is generated relating to at least three non-colinear geometric features of an ideal object (i.e. points A, B, C and D). Typically, the computer and interface circuits 38 of the system 10 translate the video signals generated at blocks 30 and 32 from the camera 20 into this reference data under program control.

The calibration data or information as well as the reference data or information are thereafter stored in a mass storage unit 40 of the system 10.

Alternatively, the calibration and reference data can be manually input into the system 10 through an I/O terminal 42 of the system 10. The I/O terminal 42 may include both video and data monitors to display camera information as well as other information relating to the system 10.

The computer and interface circuits 38 in general provides video interfacing to the camera 20 as well as any other camera in the system. In general, a processor portion (not shown) of the computer and interface circuits 38 has the ability to perform operations such as convolutions, shift copies and the like on video memory (not shown) of the circuits 38. The computer and interface circuits 38 also include memory (not shown) to accommodate system software and several frames of video images and also includes a communication port for interfacing with various peripheral devices such as a robot controller 44 of the robot 14.

After the system 10 has stored the camera calibration, model and object target reference data, the system is ready to automatically determine the position and orientation of the object 16 from a digital image generated by the camera 20. As described below, after the initial position and orientation of the object 16 is determined by the system 10, the system 10 then automatically generates offset data for use by the robot 14 to move to the object 16.

At block 34, the camera 20 generates gray scale digital image of the object 16.

At block 36, the targets or geometric features A, B, C and D are then located within the digital image. The targets can be located by any well known algorithm If the targets are circles, the targets may be located in accordance with the teachings of U.S. Pat. No. 4,707,647 having the same assignee as the present application.

Referring again to FIG. 2 at block 46, in general the pixels which form the digital image are transformed via a calibration matrix to extract 3-D lines. As further illustrated by blocks 50 and 54 in FIG. 3, the 3-D lines 52 are extracted or generated in an iterative fashion. If multiple cameras are used or if the single camera 20 is moved to obtain multiple subimages which are later combined to obtain a single digital image, block 56 checks to see if all of the required images have been acquired.

Figure 4:
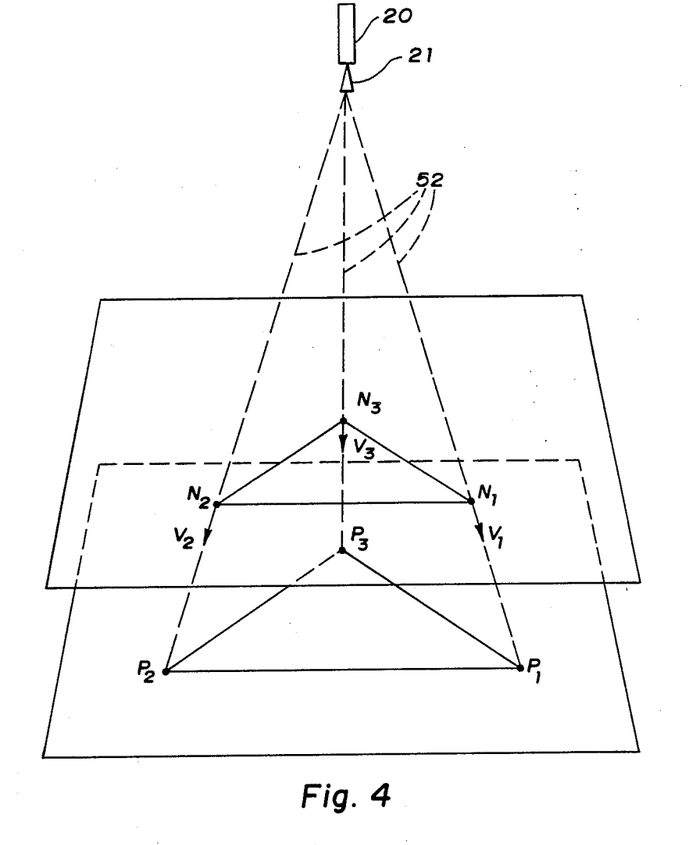
FIG. 4 is a schematic view illustrating various image planes useful in visualizing the mathematics utilized in the method and system of the present invention.

FIG. 4 is an illustration of a simplified version of the method and system of the present invention where as few as three targets or geometric features are utilized. The 3-D lines 52 contain each current point $P_1$, $P_2$ and $P_3$ on the object 16. $V_1$, $V_2$ and $V_3$ are the unit direction components of the 3-D lines passing through the optical center of the lens system 21 and through their respective object points $P_1$, $P_2$, and $P_3$. Each $N_1$ of the points $N_1$, $N_2$ and $N_3$ is a point on a reference plane which intersects its respective 3-D line 52 and which is chosen to most closely match the direction of its respective unit direction component $V_1$. In other words, each point $N_i$ is the intersection of its respective 3-D line with a plane whose normal is the dominant unit direction vector, $V_i$ of the 3-D line 52 and which passes through the reference point.

As is described in greater detail hereinbelow, each of the points $N_1$, $N_2$ and $N_3$ is used as a starting point for use by an iterative algorithm, which defines the actual locations of the new points on the 3-D lines.

Referring again to FIG. 2, in general, at block 58 3-D math is utilized to determine the new 3-D points. The details of block 58 are illustrated at blocks 60, 62, 64, 66, 68, 70, 72, 74, 76, 78, 80 and 82 in FIG. 3.

At block 60, the previously mentioned reference planes are calculated for and include each $N_i$. The normals to the reference planes are approximately in the same direction as its respective unit direction vector $V_i$.

At block 62, the intersection of the 3-D lines 52 and the reference planes generated at block 60 are calculated to determine each of the $N_i$'s.

Each of the new points of interest on the object 18 is given by equation 1 as follows:

$$P_i = k_i * V_i + N_i \quad (P,V,N = 3 \times 1 \text{ vectors} \rightarrow X, Y, Z) \quad (1)$$

($i$ is index 1 ... $n$)

The $V_i$'s were obtained at block 50 and the $N_i$'s were obtained block 62 of the algorithm of FIG. 3. In general and as described in greater detail hereinbelow, each of the $P_i$'s is determined by using rigid body constraint of distances between reference points to find the location of points on the 3-D lines which minimizes the sum of the squares of the differences between new point distances and reference point distances.

At block 64, equations in the form of error functions which are to be solved are defined at equation 2 as follows:

$$(d_{ij})^2 = (P_i - P_j)' (P_i - P_j); i = 1 \ldots (n-1), j = (i+1) \ldots n \quad (2)$$

(' indicates transpose)

wherein the term $(d_{ij})^2$ is given by equation 3 as follows:

$$e_{ij} = (P_i - P_j)'(P_i - P_j) - (d_{ij})^2 \quad (3)$$

Equation 2 may be expanded to equation 3.5 as follows:

$$e_{ij} = K_i^2 V_i' V_i - 2k_i k_j V_i' V_j + k_j^2 V_j' V_j + k_i V_i'(N_i - N_j) - k_j V_j'(N_j - N_i) - N_i' N_j - d_{ij}^2 \quad (3.5)$$

Or, in general terms by equation 3.6 as follows:

$$e_{ij} = a1*k_i^2 + a2*k_i k_j + a3*k_j^2 + a4*k_i + a5*k6 + a6 \quad (3.6)$$

where the a's are known and the k's are unknown

The squared error function is given by equation 4 as follows:

$$(e_{ij})^2 = [(P_i - P_j)'(P_i - P_j) - (d_{ij})^2]^2 \quad (4)$$

and a total squared error function is given by equation 5 as follows:

$$f = \sum_{i=1}^{n-1} \left[ \sum_{j=i+1}^{n} ((e_{ij})^2) \right] \quad (5)$$

One of the first steps is to find the zeros of the functions described by equation 4. Equation 5 is modified such that there are many equations, each one of which sums only functions described by equation 4 and which contains a k associated with the current equation (1 ... n). Since the objective is to quickly find zeros and since the functions described by equation 4 may not have a zero, a small value is added to the distance value in equation 3. This helps to insure that each equation in equation 4 contains a zero.

Consequently, there are n equations and n unknowns. In order to solve equation 4, the Newton-Rhapson method as described by equation No. 6 is utilized as follows:

$$X(i+1) = X_i - (Inv([J(X_i)]) * F(X_i)) \quad (6)$$

As is well known, the Newton-Rhapson algorithm is utilized to find a zero of n functions of n variables such as F(X). In order to utilize the Newton-Rhapson algorithm, a Jacobian Matrix (i.e. the first partial derivatives with n functions and n unknowns) must be set up as indicated by block 66 and is represented by the term "$J(X_i)$". Also, a function vector (i.e. $F(X_i)$) having n functions and n unknowns is set up.

The solution of equation 4 is represented by block 68 which defines the estimated solution by equation 6.

At block 70, the solution is tested to determine whether it is acceptable. If the solution is not acceptable, the estimated solutions are re-initialized at block 72.

At block 74, the second major step of the algorithm of block 58 begins. This step attempts to acceptable, the estimated solutions are re-initialized at block 72.

At block 74, the second major step of the algorithm of block 58 begins. This step attempts to find the k's which minimize the error defined by equation 5. Because there is one equation with n unknowns, the Newton-Rhapson method described by equation 7 may be utilized as follows:

$$X(i+1) = X_i - (INV([H(X_i)]) * G(X_i)) \quad (7)$$

As is well known, the Newton-Rhapson algorithm is utilized to find a zero of n functions of n variables, such as F(X). For small x's iterations are performed until the absolute value between the x's is less than a predetermined tolerance.

Equation 7 requires the use of a Hessian Matrix which is set up in block 74. As is well known, the Hessian Matrix is a matrix of second partial derivatives having one function and n unknowns and is given by the term $H(X_i)$. Also, in order to solve equation 7 it is required that a Gradient Vector $G(X_i)$ also be set up. The solution of equation 7 is illustrated by block 76.

At block 78, the solution is tested and if the solution is not acceptable, a flag error is generated at block 80. If the solution is acceptable, the new 3-D points are calculated by equation 1 at block 82 since all of the k's are now determined. The new 3-D points can then be utilized to determine the position and attitude of the object 18.

Referring again to FIGS. 2 and 3, at block 84, cartesion offsets are generated in any one of a number of well known fashions. However, preferably the cartesion 3-D offsets are generated as described in Berthold Horn's paper entitled "Closed-Form Solution of Absolute Orientation Using Unit Quaternions", Vol. 4, Finally, at block 86 the 3-D offset generated at block 84 is transformed to the coordinate frame of the robot and utilized to offset the robot path.

The above-noted system and method are capable of determining the position and attitude of a rigid body in 3-D space by utilizing three geometric features generated by as few as a single camera without the need for structured lighting. By using multiple cameras, the system 10 can enhance precision for large objects of interest or used when one or more target features may be occluded when viewed by a single camera such as the camera 20. This information can thereafter be communicated to any type of peripheral device such as a robot.

The 3-D machine vision system 10 of the present invention does not require the use of highly specialized or complex hardware and is robust (i.e. tolerates small variations in work pieces, camera adjustment and ambient light without significant degradation of system performance). The calibration of the system 10 is quickly and easily accomplished and if the need for camera or lens replacement arises only that particular camera need be recalibrated.

The invention has been described in an illustrative manner and, it is to be understood that, the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. Method for automatically determining the position and orientation of an object in 3-D space from as few as one digital image generated by as few as one 2-D sensor, the method comprising the steps of:
   generating sensor calibration data relating the position and orientation of the 2-D sensor to the 3-D space;
   generating reference data relating to at least three non-collinear geometric features of an ideal object;
   generating the digital image containing the at least three-non-collinear geometric features of the object wherein at least two of the features reside in the image generated by the one 2-D sensor;
   locating each of the features in the digital image;
   computing at least three non-parallel 3-D lines as a function of the feature locations and the sensor calibration data, each of the 3-D lines passing through its respective feature of the object at a reference point;
   determining a starting point on each of the 3-D lines in the vicinity of its associated reference point;
   determining the actual 3-D location of each feature on its associated 3-D line utilizing the reference data and its respective starting point on the 3-D line; and
   utilizing the reference data and the actual 3-D location of each of the features to determine the position and orientation of the object.

2. The method of claim 1 wherein the step of generating the digital image includes the step of:
   generating first and second digital sub-images, the first and second sub-images defining the digital image.

3. The method of claim 2 wherein the method utilizes first and second 2-D sensors to generate the first and second digital sub-images, respectively, wherein the method further comprises the step of generating sensor calibration data relating the position and orientation of the second 2-D sensor to the 3-D space and wherein the at least three 3-D lines are also a function of the calibration data of the second 2-D sensor.

4. The method of claim 1 wherein each of the at least three features of the ideal object is a point and wherein the 3-D lines intersect at a common point.

5. The method of claim 1 wherein the image is a gray scale digital image.

6. The method of claim 4 wherein the 2-D sensor is a camera having a lens system with an optical center and wherein the common point is the optical center of the lens system.

7. The method of claim 1 wherein the object is a rigid body.

8. The method of claim 1 wherein the 2-D sensor is a camera.

9. The method of claim 1 wherein said step of determining a starting point on each of the 3-D lines includes the step of generating at least three initial position estimates of the starting points as a function of the locations of the features of the ideal object and each of said 3-D lines.

10. The method of claim 9 wherein said step of determining the actual 3-D location of each feature includes the step of computing the distances between pairs of the initial position estimates and between pairs of the features of the object.

11. The method of claim 10 wherein said step of determining the actual 3-D location of each feature includes the step of minimizing the differences between the distances between the pairs of the initial position estimates and the distances between the pairs of the features of the objects.

12. Method for automatically generating offset data for use by a programmable peripheral device having a coordinate frame such as a robot to move to an object in 3-D space, the method utilizing as few as one digital image generated by as few as one 2-D sensor, the method comprising the steps of:
   generating sensor calibration data relating the position and orientation of the 2-D sensor to the 3-D space;
   generating reference data relating to at least three non-collinear geometric features of an ideal object;
   generating the digital image containing the at least three non-collinear geometric features of the object wherein at least two of the features reside in the image generated by the one 2-D sensor;
   locating each of the features in the digital image;
   computing at least three non-parallel 3-D lines as a function of the feature locations and the sensor calibration data, each of the 3-D lines passing through its respective feature of the object at a reference point;

determining a starting point on each of the 3-D lines in the vicinity of its assoaciated reference point;

determining the actual 3-D location of each feature on its associated 3-D line utilizing the reference data and its respective starting point on the 3-D line;

utilizing the reference data and the actual 3-D location of each of the features to determine the position and orientation of the object;

calculating an offset of the object from the 2-D sensor as a function of the position and orientation of the object; and transforming the offset of the object to the coordinate frame of the peripheral device.

13. The method of claim 12 wherein the step of generating the digital image includes the step of:

generating first and second digital sub-images, the first and second sub-images defining the digital image.

14. The method of claim 13 wherein the method utilizes first and second 2-D sensors to generate the fist and second digital sub-images, respectively, wherein the method further comprises the step of generating sensor calibration data relating the position and orientation of the second 2-D sensor to the 3-D space and wherein the at least three 3-D lines are also a function of the calibration data of the second 2-D sensor.

15. The method of claim 12 wherein each of the at least three features of the ideal object is a point and wherein the 3-D lines intersect at a common point.

16. The method of claim 15 wherein the 2-D sensor is a camera and wherein the common point is the optical center of the lens system.

17. The method of claim 12 wherein the object is a rigid body.

18. The method of claim 12 wherein the 2-D sensor is a camera.

19. The method of claim 12 wherein said step of determining a starting point on each of the 3-D lines includes the step of generating at least three initial position estimates of the starting points as a function of the locations of the features of the ideal object and each of said 3-D lines.

20. The method of claim 19 wherein said step of determining the actual 3-D location of each feature includes the step of generating at least three initial position estimates as a function of the locations of the features of the ideal object and each of said 3-D lines.

21. The method of claim 20 wherein said step of determining the actual 3-D location of each feature includes the step of computing the distances between pairs of the initial position estimates and between pairs of the features of the object.

22. A vision system for automatically determining the position and orientation of an object in 3-D D space from as few as one digital image generated by as few as one 2-D sensor, the system comprising:

first means for storing reference data relating to at least three non-collinear geometric features of an ideal object;

2-D sensor means for generating the digital image containing the at least three non-collinear geometric features of the object, the 2-D sensor means including the one 2-D sensor wherein at least two of the features reside in the image generated by the one 2-D sensor;

second means for storing sensor calibration data relating the position and orientation of the 2-D sensor means to the 3-D space;

means for locating each of the features in the digital image;

means for computing at least three non-parallel 3-D lines as a function of the feature locations and the sensor calibration data, each of the 3-D lines passing through its respective feature of the object at a reference point;

determining a starting point on each of the 3-D lines in the vicintiy of its associated reference point;

determining the actual 3-D location of each feature on its associated 3-D line utilizing the reference data and its respective starting point on the 3-D line; and means for utilzing the reference data and the actual 3-D locations of each of the features to determine the position and orientation of the object.

23. The system of claim 22 wherein said 2-D sensor means includes first and second 2-D sensors for generating first and second digital sub-images, the first and second sub-images defining the digital image.

24. The system of claim 23 wherein said second means for storing stores sensor calibration data relating the position and orientation of the first and second 2-D sensors to the 3-D space and wherein the at least three 3-D lines are a function of the calibration data of the first and second 2-D sensors.

25. The system of claim 22 wherein each of the at least three features of the ideal object is a point and wherein the 3-D lines intersect at a common point.

26. The system of claim 25 wherein the 2-D sensor is a camera having a lens system with an optical center and wherein the common point is the optical center of the lens system.

27. The system of claim 22 wherein the object is a rigid body.

28. The system of claim 22 wherein the 2-D sensor is a camera.

29. The system of claim 22 wherein said means for determining a starting point includes position estimating means for generating at least three initial position estimates of the starting points as a function of the locations of the features of the ideal object and each of said 3-D lines.

30. The system of claim 29 wherein said means for determining the actual 3-D location of each feature includes means for computing the distances between piars of the initial position estimates and between pairs of the features of the object.

31. The system as claimed in claim 30 wherein said means for determining the actual 3-D location of each feature includes means for minimizng the differences between the distances between the pairs of the initial position estimates and the distances between the pairs of the features of the object.

32. A vision system for automatically generating offset data for use by a programmble peripheral device having a coordinate frame such as a robot to enable the peripheral device to move to an object in 3-D space from as few as one digital image generated by as few as one 2-D sensor, the system comprising:

first means for storing sensor calibration data relating to at least three non-collinear geometric features of an ideal object;

2-D sensor means for generating the digital image containing the at least three non-collinear geometric features of the object, the 2-D sensor means including the one 2-D sensor wherein at least two of the features reside in the image generated by the one 2-D sensor;

second means for storing sensor calibration data relating the position and orientation of the 2-D sensor means to the 3-D space;

means for locating each of the features in the digital image;

means for computing at least three non-parallel 3-D lines as a function of the feature locations and the sensor calibration data, each of the 3-D lines passing through its respective features of the object at a reference point;

determining a starting point on each of the 3-D lines in the vicinity of its associated reference point;

determining the actual 3-D location of each feature on its associated 3-D line utilizing the reference data and its respective starting point on the 3-D line;

means for utilizing the reference data and the actual 3-D locations of each of the features to determine the position and orientation of the object;

means for calculating an offset of the object from the 2-D sensor means as a function of the position and orientation of the object; and means for transforming the offset of the object to the coordinate frame of the peripheral device.

33. The system of claim 32 wherein said 2-D sensor means includes first and second 2-D sensors for generating first and second digital sub-images, the first and second sub-images defining the digital image.

34. The system of claim 33 wherein said second means for storing stores sensor calibration data relating the position and orientation of the first and second 2-D sensors to the 3-D space and wherein the at least three 3-D lines are a function of the calibration data of the first and second 2-D sensors.

35. The system of claim 32 wherein each of the at least three features of the ideal object is a point and wherein the 3-D lines intersect at a common point.

36. The system of claim 35 wherein the 2-D sensor is a camera having a lens system with an optical canter and wherein the common point is the optical canter of the lens system.

37. The system of claim 32 wherein the object is a rigid body.

38. The system of claim 32 wherein the 2-D sensor is a camera.

39. The system of claim 32 wherein said means for determining a starting point includes position estimating means for generating at least three initial position estimates of the starting points as a function of the locations of the features of the ideal object and each said 3-D lines.

40. The system of claim 39 wherein said means for determining the actual 3-D location of each feature includes means for computing the distances between pairs of the initial position estimates and between pairs of the features of the object.

41. The system of claim 40 wherein said means for determining the actual 3-D location of each feature includes means for minimizing the differences between the distances between the pairs of the initial position estimates and the distances between the pairs of the features of the object.

* * * * *